Figure 6:
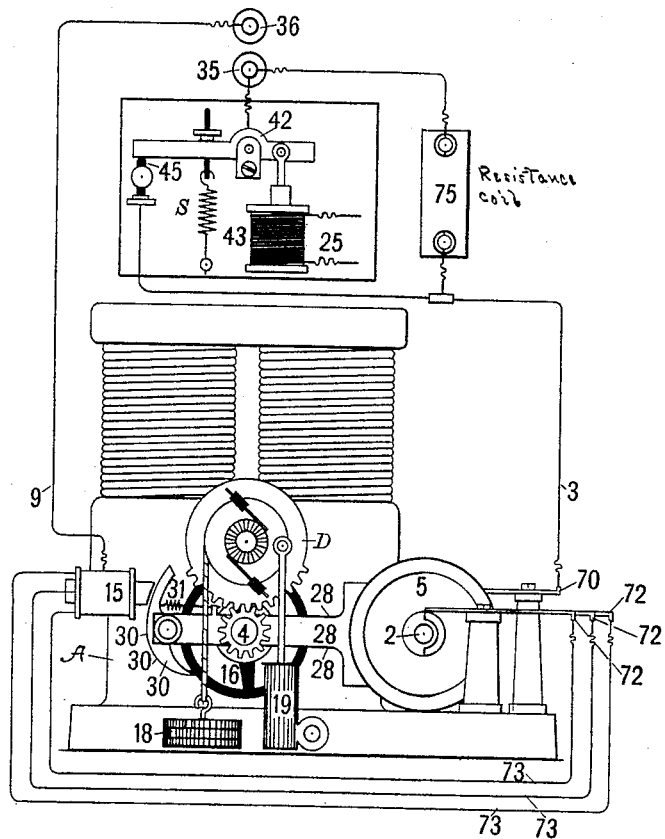

(No Model.) 2 Sheets—Sheet 1.
J. M. BRADFORD.
ELECTRIC REGULATING APPARATUS.
No. 477,637. Patented June 28, 1892.
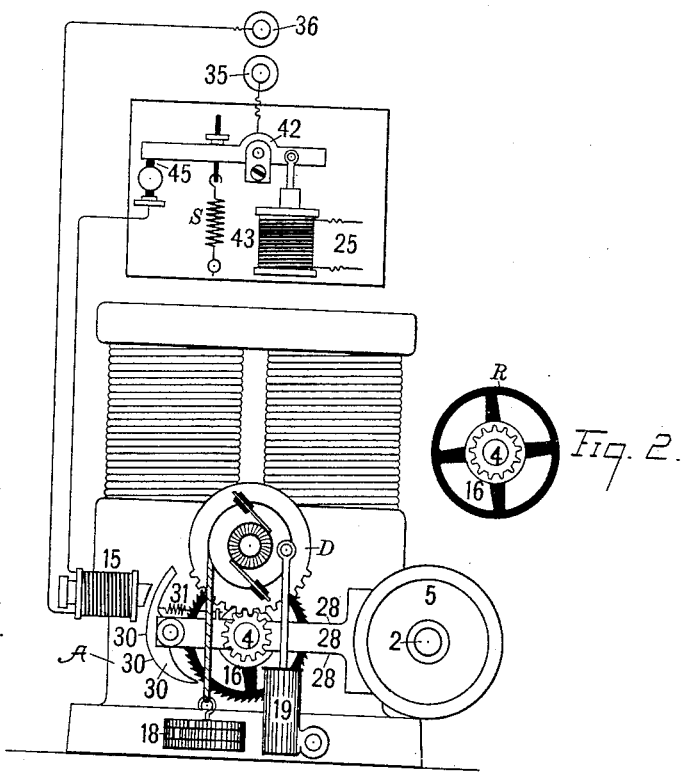
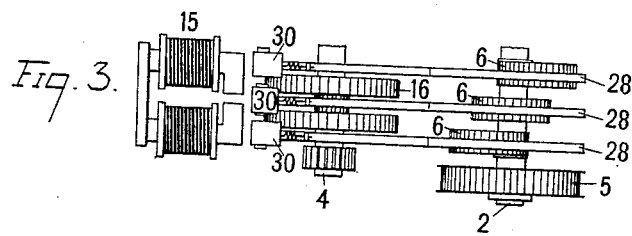
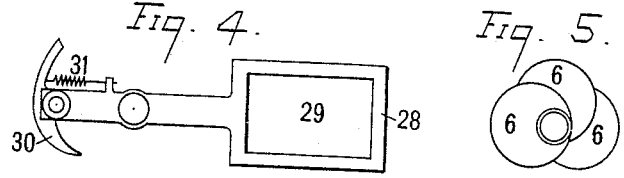
WITNESSES:
Albert C. Neal
Henry C. Houston
INVENTOR:
J. M. Bradford (No Model.) 2 Sheets—Sheet 2.

J. M. BRADFORD.
ELECTRIC REGULATING APPARATUS.

No. 477,637. Patented June 28, 1892.

WITNESSES:
Albert C. Neal
Henry C. Houston

INVENTOR:
J. M. Bradford

UNITED STATES PATENT OFFICE.

JULIEN M. BRADFORD, OF PORTLAND, MAINE.

ELECTRIC REGULATING APPARATUS.

SPECIFICATION forming part of Letters Patent No. 477,637, dated June 28, 1892.

Application filed September 29, 1890. Serial No. 366,608. (No model.)

*To all whom it may concern:*

Be it known that I, JULIEN M. BRADFORD, a citizen of the United States, residing in Portland, in the county of Cumberland and State of Maine, have invented new and useful Improvements in Apparatus for Maintaining a Uniform Current in Electric Circuits, of which the following is a specification.

My invention relates to systems of electrical distribution; and the purpose thereof is to provide automatic means whereby the current strength upon circuits may be regulated and maintained at a certain degree or at a substantially uniform intensity.

The apparatus described in the following specification is widely applicable to different systems of generating and distributing direct and alternating currents, being especially intended to control the current on incandescent and arc light circuits for the purpose of preventing dangerous electrical pressure and securing uniformity of light and other advantages incident to proper regulation.

A prominent feature of this invention is that the auxiliary motive power which moves the regulating mechanism is distinct and independent of the controlling power, the former being obtained from any suitable motor and the latter being engendered by slight variations of the current which is being regulated, such slight variations being used solely to cause the motive power to make the necessary movements of the regulating mechanism and not being in any way directly instrumental in applying force to effect this object.

The object is to move the regulating mechanism by the motive power with sufficient quickness and precision to prevent the development of variations of current that are liable to occur in the circuit to be regulated and to cut off this action sooner or later, according to the time required to move that regulating mechanism to a position where exactly the required current will be taken up. The regulating mechanism is moved progressively, not intermittingly or irregularly, but with regular motion. This action begins on the inception of a slight increase or decrease of the main current to be regulated instead of being the result of or in proportion to the development of an increase or decrease of that current. Another advantage gained by separating the motive power from the controlling power in a current-regulating apparatus is that the movement of the regulating mechanism is not directly dependent upon the degree of variation of the current which is being regulated. If a slight variation of that current continues, a large movement of the regulating mechanism is the result.

It is true that it is not generally advisable to move the commutator-brushes of a series dynamo far from certain positions on account of sparking at the brushes; but in machines with a field fed with a separate current the current-varying device controlling the feeding-current may be largely moved by my apparatus and the output of the dynamo correspondingly increased or diminished by this means.

The apparatus may be used to regulate circuits for constant potential or for constant current, according to the arrangement and requirements in different cases. To control the generative capacity of dynamo-electric machines either by moving the commutator-brushes or by operating a current-varying device—such as a rheostat—controlling the current feeding the field-magnet or to directly control the current entering a line-circuit are among the purposes of this apparatus.

The above modes of regulation have been illustrated and described in United States Patent No. 429,333, of June 3, 1890, in which is explained my process of maintaining a uniform current in electric circuits, which process relates to the subject-matter of this specification.

Figure 7:
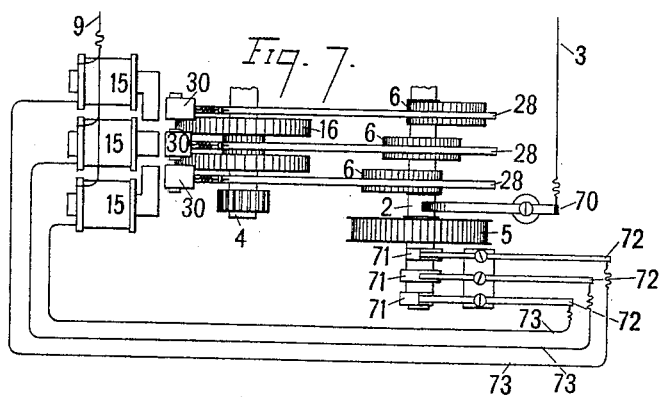
Figure 8:
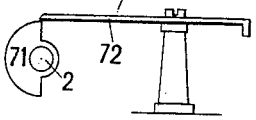

Of the drawings, Figure 1 is a side view showing the apparatus arranged to regulate a circuit by shifting the commutator-brushes of a dynamo-electric machine, also a current-indicator in electrical connection therewith. Fig. 2 is a side view of wheel 16, designed to be moved by friction. Fig. 3 is a plan of a detail of Fig. 1. Fig. 4 is a side view of a regulating device. Fig. 5 is a side view of a group of driving-eccentrics. Fig. 6 is a side view of an arrangement to regulate a circuit by shifting the commutator-brushes of a dynamo-electric machine, also a current-indicator in electrical connection therewith. Fig. 7 is a plan of a detail of Fig. 6. Fig. 8 is a side view of a detail of Fig. 6.

In making a practical application of this apparatus the pulley 5 may be belted to any suitable source of power, such as the driving-shaft of a dynamo. Pulley 5 is joined to shaft 2, which has eccentrics 6 fixed to it at an angle one to the other, as shown in Fig. 5. The eccentrics are in operative contact with regulating devices, one of which is shown in Fig. 4. A regulating device may consist of a lever 28, with open frame 29, pawl 30, and spring 31.

The above-described angular adjustment of the eccentrics in connection with the regulating devices may be said to be an arrangement for accumulative action, because a practically uninterrupted movement of wheel 16 may thereby be obtained.

I am aware that the means used to move the current-varying mechanism described in this specification is similar in several respects to that shown in Patents No. 410,663, dated September 10, 1889, and No. 429,333, dated June 3, 1890. I do not, however, claim this invention simply as a new machine to produce an old result, but as apparatus capable of producing a new or improved result. By the Giles patent of record when the main current rises slightly above or falls slightly below a given mean a separate local circuit is closed by the current-indicator, causing an electro-magnet to throw in gear an auxiliary motor, and thereby move the brushes in the right direction to correct the variation. This movement of the brushes by a pawl is intermittent instead of being regularly progressive. Therefore the liability of destroying regulation by such action is directly in proportion to the energy of movement imparted to the brushes by the motor. Moreover, with a current-indicator adjusted for sensitiveness operating by closing and breaking two separate circuits both circuits will not remain broken for a perceptible time. This is owing partly to the fact that a given current entering the field-magnet coils of a dynamo does not instantly produce its maximum effect. Therefore without means of differentiating the effect of the regulating mechanism the liability of destroying regulation by closing and breaking separate circuits is in direct proportion to the energy of movement of the brushes.

By my apparatus the current-varying mechanism may be moved unintermittingly in either direction by the breaking or closing of a local circuit. When the circuit is broken or closed for a perceptible time, a prompt movement of the current-varying mechanism results. If the circuit is broken and closed in rapid succession, magnet 15 and springs 31, acting in opposition to each other, do not cause pawls 30 to firmly grasp or to fully release wheel 16. Therefore there is little or no movement of the current-varying mechanism. The current-indicator, operating wholly by the make and break of a single circuit, is capable of extreme sensitiveness. The regulating devices change quickly from accumulative to differential action, causing the current-varying device to move with various degrees of quickness or to remain stationary.

The rate of motion of the driving-eccentrics 6 should be sufficiently slow to insure regularity of action, energy of action being attained by a continual succession of long strokes of the regulating devices rather than by short strokes of great quickness of motion. The wheel 16 is fixed to shaft 4, supported by frame A, to which shaft is joined a small gear meshing with gear D directly above. The wheel 16 may be made with a deep slot to receive one of the levers 28, the other two being arranged on either side, as shown in Fig. 3. The levers 28 are loosely supported upon shaft 4. The wheel 16 and the gear D, with which it is in operative contact, may be called the "regulating mechanism" of the dynamo shown in Fig. 1. As the commutator-brushes are attached to gear D, they therefore shift with its movement and vary the current feeding the field-magnet. A weight 18 may be attached to gear D to act as a traction device, thereby imparting to said gear and brushes a constant tendency to move in a direction opposite to that imparted to them by the regulating devices. A retarding device—such as a dash-pot 19, filled with oil or glycerine—may be connected with this gear, thereby causing it to move with friction and with less quickness than it otherwise would. The wheel 16 may have teeth to engage with pawls 30, or the rim R of this wheel may be composed of rubber and the pawls move it by friction.

A free movement of wheel 16 by pawls 30 is promoted by leverage resulting from the relative diameters of the gears. This leverage may be increased, and to prevent the movement of the regulating mechanism being proportionally diminished thereby the length of the pawl-strokes may be increased. By this means the extra duty is merely required of the motive power, the duty required of controlling-magnet 15 being diminished thereby. A special arrangement, in which wheel 16 is moved by friction, is shown in Fig. 6, which will be subsequently described.

The operation of the apparatus shown in Fig. 1 is substantially as follows: A part or the whole of the current from the circuit to be regulated flows through wires 25 to helix 43. The tension of spring S is adjusted so that lever 42 will not be lifted from screw 45 until the current to be regulated has slightly exceeded the required degree. The binding-posts 35 and 36 derive a current of suitable strength from the dynamo or other source. Therefore while lever 42 rests upon screw 45 a local current flows from binding-post 35 to lever 42, thence to magnet 15 and back to binding-post 36, representing the other pole of the local circuit. The magnet 15 is thereby energized, causing pawls 30 to engage with wheel 16, which is moved by the motion of levers 28, which carry pawls 30. The wheel D is thereby moved in opposition to the traction of weight 18, and the brushes of the dynamo are shifted to increase the current which is being regulated. The instant the current to be regulated is sufficient to lift lever 42 from screw 45 the local current through magnet 15 is thereby broken, or said current may be greatly weakened by passing through a resistance 75, arranged as shown in Fig. 6, causing pawls 30 to instantaneously release the wheel 16 and the brushes of the dynamo to be shifted in the opposite direction by weight 18, thereby reducing the current which is being regulated. When the current to be regulated declines, lever 42 again touches screw 45, thereby energizing magnet 15 and causing pawls 30 to engage with the wheel 16 and instantaneously cut off its motion. The above action is repeated as often as required and the regulation of the current thereby maintained. The rate of motion imparted in a given direction to gear D and the commutator-brushes attached may be increased by increasing the weight 18 or by connecting the lever from the dash-pot nearer to the center of said gear; or this motion may be retarded by reversing such adjustments; also, the rate of motion imparted in the opposite direction to said gear may be altered by altering the rate of motion of the driving-eccentrics. This action may be said to be independent, because it does not depend upon the degree of variation of the main current to be regulated, also because by the above-described adjustments the commutator-brushes may, if desired, be moved faster in one direction than in the opposite direction.

A special arrangement in which wheel 16 is moved by the friction of pawls 30 and the energy of magnets 15 expended with economy is shown in Fig. 6.

The pawls 30 are driven by separate eccentrics 6, arranged on the driving-shaft 2, as before described. The indicator-lever 42 is deflected by variations of the current to be regulated, as before explained. Therefore when this lever touches screw 45 a current flows through wire 3 to contact-spring 70, thence to shaft 2, thence to the circuit-shifters 71, joined to said shaft, thence to springs 72, thence by wires 73 to magnets 15, and thence by wire 9 to binding-post 36. By this arrangement each circuit-shifter 71 breaks and closes an electric circuit and the current in each circuit energizes a magnet 15 and each magnet 15 controls a pawl 30. The adjustment of said circuit-shifters is such that the rotation of shaft 2 allows a current to flow to a magnet 15, while the pawl which is controlled by said magnet is moving downward, the current being shut off and the pawl thereby relieved while making the return stroke, which imparts no movement to wheel 16. Each circuit-shifter, one of which is shown in Fig. 8, may consist of a cam 71 of such shape that spring 72 rests thereon only while a pawl 30 is making the downward stroke.

The rim R of wheel 16 is composed of suitable material, upon which pawls 30 may constantly rest with slight pressure, slipping to and fro during each revolution of eccentrics 6, but imparting no movement to the wheel, excepting when indicator-lever 42 rests upon screw 45, which causes a pawl to clutch and move the wheel.

To promote accuracy of action and sensitiveness to changes in the current to be regulated, the pawls 30 may remain in contact with wheel 16. Therefore magnets 15 may be placed very close to pawls 30 and no perceptible movement of the latter is required to cause them to firmly grasp the wheel.

The attraction of a magnet for its armature varies in proportion to the squares of the distance between said armature and the magnet. Therefore if perceptible movement is required to bring the pawls 30 in and out of contact with friction-wheel 16 the energy of magnets 15 is wasted, and a wheel moved by friction does not respond with maximum quickness to changes in the current to be regulated.

By allowing pawls 30 to remain in contact with wheel 16 this change in attraction is avoided, the energy of magnets 15 is utilized with economy, and wheel 16 responds with maximum quickness to changes in the current to be regulated.

A resistance 75 is interposed between binding-post 35 and wire 3, so that a weak current may flow to wire 3 when lever 42 breaks contact with screw 45. By this arrangement the electric current operating magnets 15 is not broken, but thrown into waves, increasing and diminishing in force as lever 42 rests upon or is lifted from screw 45. The arrangement has tendency to prevent the contact-points of lever 42 and screw 45 from being oxidized by sparks; also, the variable currents energize magnets 15 in such manner that pawls 30 press with varying force upon wheel 16, thereby causing the current-varying device to be moved at different degrees of speed. When lever 42 is lifted from screw 45, the weak current flowing from resistance 75 is not sufficient to cause pawls 30 to hold wheel 16. Therefore weight 18 begins to move said wheel in the opposite direction immediately after lever 42 is lifted from screw 45; also, springs 31 are not absolutely necessary, because pawls 30 and wheel 16 may remain in contact.

What I claim is—

1. In a current-regulator, the combination of a brush-shifter or current-varying device, regulating devices arranged to move said brush-shifter in one direction, mechanism responsive to incipient increase and decrease of line-current for controlling said regulating devices, a traction device attached to said brush-shifter to move it in the opposite direction, and auxiliary means operating independently of variations of line-current to cause said brush-shifter to be moved progressively to positions where sufficient current will be taken up.

2. In a current-regulator, the combination of a current-varying device, regulating devices arranged to move said current-varying device in one direction, an electro-magnet and local circuit to control said regulating devices, a line-current indicator to break and close local circuit, a traction device attached to said current-varying device to move it in the opposite direction, and driving-eccentrics angularly arranged to cause said current-varying device to be moved progressively, thereby preventing development of variations of current in the line-circuit.

3. In an electric-current regulator, the combination of a friction-wheel, regulating devices in constant contact with said friction-wheel, eccentrics and circuit-shifters operated by a driving-shaft, and electro-magnets and electric circuits to control said regulating devices through incipient increase of current, thereby causing said friction-wheel to move progressively.

JULIEN M. BRADFORD.

Witnesses:
Z. K. HARMON,
HENRY C. HOUSTON.